Dec. 1, 1964 T. D. ROSSING 3,159,821

MAGNETIC CORE MATRIX

Filed Sept. 25, 1957 2 Sheets-Sheet 1

INVENTOR:

Thomas D. Rossing,

BY Cushman, Darby & Cushman

ATTORNEYS.

INVENTOR:
Thomas D. Rossing,
BY Cushman, Darby & Cushman
ATTORNEYS.

United States Patent Office 3,159,821

Patented Dec. 1, 1964

3,159,821
MAGNETIC CORE MATRIX

Thomas D. Rossing, Northfield, Minn., assignor to Sperry Rand Corporation, New York, N.Y., a corporation of Delaware Filed Sept. 25, 1957, Ser. No. 686,152
23 Claims. (Cl. 340—174)

This invention relates to magnetic core memory matrices, and in particular, to a matrix in which the magnetic remanent state of a core can be conveniently interrogated without destroying the information contained therein.

Several systems have been suggested for obtaining non-destructive readout from magnetic memory cores individually, co-pending applications hereinafter mentioned providing exemplary systems.

These and like systems, however, when applied to a three-dimensional matrix result in undue complexity in the wiring needed to connect each core in a memory plane and each plane to other planes in forming a complete core matrix memory system. Since the non-destructive interrogation windings lie in the direction of a word register, the use of coincident current writing in the conventional manner requires one inter-plane connection for each register. In a memory system of large capacity using conventional methods of wiring, the costs become excessive.

In accordance with this invention wherein the cores included in a binary word register are all on one physical memory plane, non-destructive interrogation of said cores may be conveniently accomplished without any additional inter-plane connecting lines, thereby saving not only a large amount of wire and assembly time, but also time and expense in making appropriate solder connections or the like. By rearranging the intra-plane lines so that coincident current selection of any one core in any of the different planes is possible, such non-destructive interrogating systems which normally require excessive extra wiring, may be added without any additional inter-plane connections.

Accordingly, it is a prime object of this invention to provide an improved magnetic core memory matrix for storing and handling binary-coded information.

Another object is to provide a magnetic core matrix which is rearranged so that each register is wholly contained in one physical memory plane.

A further object is the provision in a magnetic core matrix of connections and windings such that each physical memory plane can be tied into a complete memory system in which information can be read out of a core without destroying the information content of that core and without requiring extra inter-plane lines for so doing.

Other objects and advantages of this invention will become obvious to those having ordinary skill in the art by reference to the following detailed description of exemplary embodiments of the apparatus and the appended claims. The various features of the exemplary embodiments may be best understood with reference to the following drawings, wherein:

Figure 1:
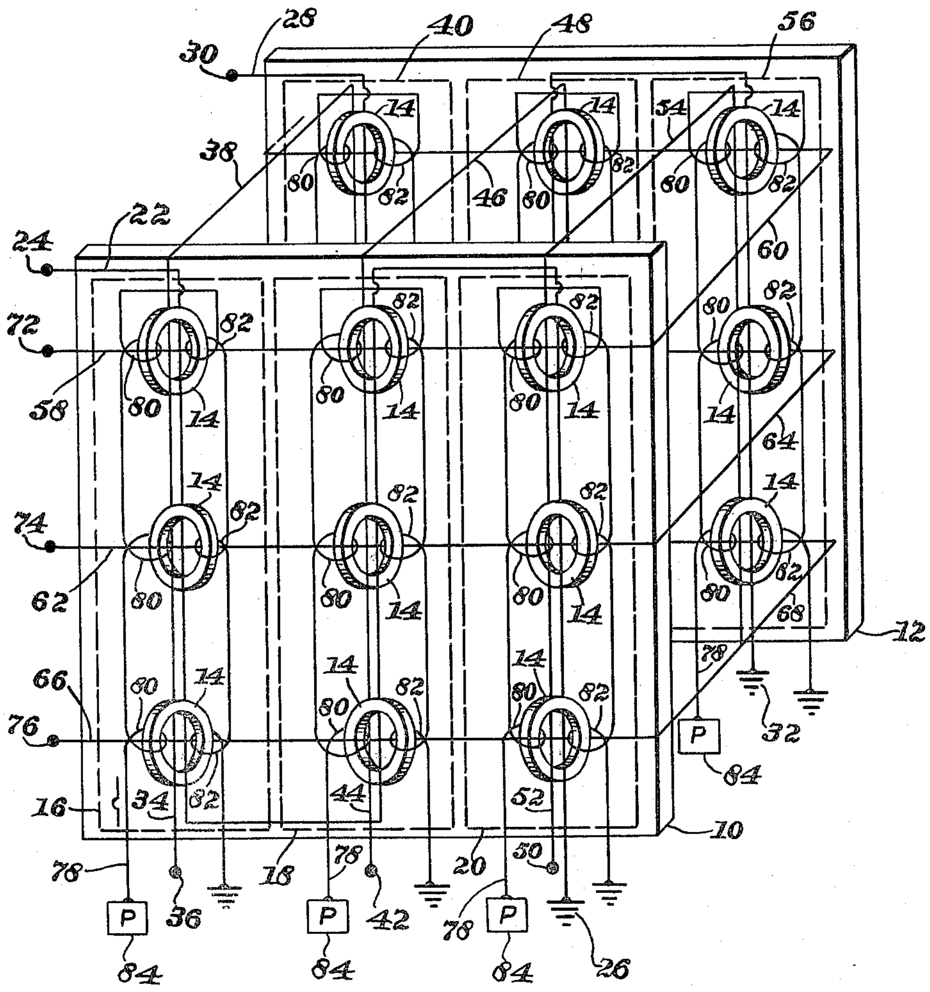
FIGURE 1 illustrates an embodiment employing toroidal cores.

An improved arrangement of bi-stable magnetic cores, whereby the advantages above mentioned are obtained, is illustrated in the exemplary embodiment of the invention shown in FIGURE 1. Instead of having the cores for a binary word register arranged so that one core in each plane in the matrix comprises a register, the cores are interconnected so that every binary word register is contained in a given plane. In this manner non-destructive interrogating means may be added to the matrix without additional wiring between the planes. It is to be understood that the illustration in FIGURE 1 is merely exemplary of a memory matrix system and that more or less planes and/or cores per plane may be employed to form a matrix of any desired size within the spirit of this invention.

Each of the planes 10 and 12 in FIGURE 1 are illustrated as having nine different cores 14 arranged in a $3 \times 3$ configuration. That is, each plane has three cores in a row and three cores in a column. In the embodiment shown in FIGURE 1, the cores in a column comprise a multi-bit binary word register. For example, the three cores in the left column enclosed by dash line 16 form a register, as do the cores enclosed by dash line 18 and by dash line 20. It is to be understood that the cores in the different rows may, instead, be termed a binary word register as long as the associated wiring is rearranged so that interrogating of the cores in any given register may be caused.

As is conventional for any given matrix, there is included in the embodiment of FIGURE 1, means for selectively changing the state of any core in any of the planes. However, the interconnection of the winding means causing this function is different in this invention than for conventional matrices. One of the drive lines 22 which may carry a coincident current has an input terminal 24. This drive line threads each of the cores in each register in plane 10 only, with the terminal end of the line being at the ground point 26. As drive line 22 threads the cores 14 in plane 10, it effectively forms a winding for each of the cores so that current passing through the drive line causes a field in the cores in one direction or the other along the remanent axis of magnetization of the cores. However, current in this drive line alone is insufficient to change the state of any of the cores. As in all coincident current matrices, a second drive line carrying current in the same relative direction as the aforementioned drive line is necessary to cause a field which will switch any one of the cores through which the coincident currents pass. Before proceeding with the explanation of the second drive line for each of the cores, it is to be understood that each one of the different planes has a first drive line similar to drive line 22 which begins and ends within the plane. For example, plane 12 has a first drive line 28 which has an input terminal 30 and which threads each of the cores 14 on plane 12, terminating at the ground reference point 32.

The second drive line for each of the cores in FIGURE 1 is arranged such that it threads the cores in one register of each plane. For example, drive line 34 for register 16 has an input terminal 36 for supplying a coincident current which passes over the drive line through the cores in register 16 only in plane 10 and thence via line 38, which is a continuation of drive line 34, through the cores in register 40 on plane 12. It is to be understood that drive line 34 by an inter-plane connection similar to line 38 may extend to other planes (not shown) so as to thread the cores in one of the registers therein.

In similar manner a coincident current may be provided to terminal 42 and over drive line 44 through the cores in register 18. The line 44 extends via inter-plane connection line 46 so as to thread the cores in register 48 of plane 12. In like manner a coincident current input at terminal 50 is carried over drive line 52 to the cores in register 20 and via inter-plane connecting line 54 to the cores in register 56 of plane 12. Drive lines 44 and 52 may also extend to other planes (not shown) and thread the cores in different registers therein. As mentioned for drive line 22, each of the drive lines 34, 44 and 52 as they pass respectively through the different cores, effectively form a winding therefor so that currents coincident in drive line 22 or 28 along with one of drive lines 34, 44 and 52 produce a field sufficient to cause the cores in the associated register to change state.

In order to make the coincident current system selective as to any one core, additional winding means are employed to inhibit all cores receiving coincident current fields except the one core whose state it is desired to change. For this purpose, a third line threads one core in each of the registers for all the planes. That is, line 58, for example, threads the top cores in each of the registers on plane 10 and extends via line 60 to thread each of the top cores in the different registers on plane 12. For other planes (not shown) this line would continue to extend to pass through one core in each of the registers in each of the different planes. In like manner, the middle row of cores for each of the registers in each plane has a line 62 threading the cores and extending between planes by an inter-plane connecting line 64. For the bottom row of cores, line 66 threads these cores and extends between planes by the connecting line 68.

To select a single core so as to ensure that the selected core is in a given state, coincident current inputs are applied not only to one of terminals 24 or 30, and to one of terminals 36, 42 or 50, but also to two of terminals 72, 74 and 76. For example, to select the middle core in the register 56 on plane 12, coincident current inputs would be applied to terminals 30, 50, 72 and 76. Without the inputs to terminals 72 and 76 all three of the cores in register 56 would be selected, but with the inputs at terminals 72 and 76, the upper and lower cores in register 56 are inhibited from changing their states. Lines 58, 62 and 66 may consequently be termed the inhibit lines since the fields produced by the currents carried thereby effectively cancel part of the field produced by coincident currents in the drive lines associated with a given core so as to inhibit that core from changing its state.

With the arrangement of cores in the above described manner so as to allow the cores for each different register to be associated with one plane only, non-destructive interrogating means may be added to the matrix without the addition of any inter-plane connecting lines. The non-destructive interrogating means employed with each core in a register is prefererably of the type disclosed and claimed in the co-pending application of T. D. Rossing and W. V. Overn, Serial No. 645,457, filed March 12, 1957, and now abandoned. However, any other type of non-destructive interrogating means may be employed with this invention. For example, without limitation intended, the non-destructive interrogating means disclosed and claimed in the co-pending S. M. Rubens application, Serial No. 648,091, filed March 25, 1957, now Patent No. 3,080,549, issued March 5, 1963, as well as that in the co-pending application of T. D. Rossing et al., Serial No. 658,258, filed May 10, 1957, now Patent No. 3,092,812, issued June 4, 1963, may be employed. The latter mentioned co-pending application shows non-destructive interrogating embodiments which are particularly applicable to thin film cores of the type employed in the embodiment disclosed in FIGURE 2 of this application.

The particular non-destructive interrogating means illustrated in FIGURE 1 includes a line 78 for each of the registers in each of the planes. This line extends to each of the cores in the associated register and forms a first winding 80 about each of the cores in the register along with a second winding 82. Windings 80 and 82 are serially interconnected within each register and each line 78 extends to a different pulse source 84. As disclosed in the co-pending Rossing et al. application, Serial No. 645,457, windings 80 and 82 on each different core are wound oppositely to each other so that a pulse from source 84 causes a momentary application of two opposing interrogating fields in the core along the remanent axis of magnetization of the core. This disturbs the remanent magnetization in the core and causes an output on any one of the lines threading the core.

To carry the output signal to appropriate sensing circuitry (not shown), the lines 58, 62 and 66, which thread different cores in each register, may be employed in a time sharing sense. That is, even though lines 58, 62 and 66 are used as inhibit lines to carry currents to inhibit certain cores from changing states during the selection of a given core, these lines may also be used as output, or sense, lines to be time shared with sensing circuitry so as to provide the outputs during an interrogating period. Of course, additional lines may be threaded through different cores in each register in the same manner as lines 58, 60 and 62 are threaded so as to allow one set of lines to be permanently connected to inhibit current providing means and another set of lines to be permanently connected to sensing circuitry. In either case, each of the lines of such a set has induced therein an E.M.F. which has a polarity indicative of the state of the magnetic core with which the line is associated. That is, if the core being interrogated is in one state, the induced E.M.F. on the output, or sense, line associated therewith is of one polarity, while if the core is in another state, the E.M.F. on the associated output line is of the other polarity.

From the foregoing, it is apparent that any one of the registers in any one of the planes may be interrogated so as to provide an indication on the output lines of the respective states of the cores in the register being interrogated, while any one of the cores may be selected during a write period so as to cause it to be set in a given magnetic state.

Figure 2:
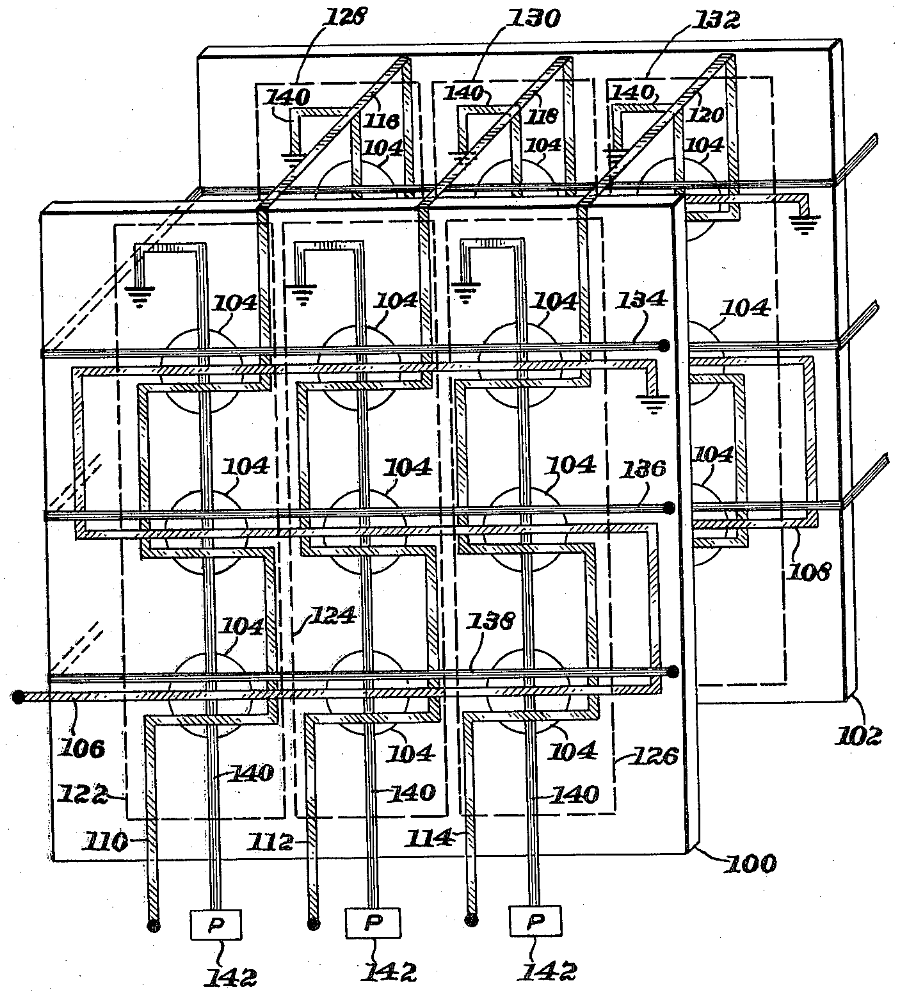
FIGURE 2 is an embodiment utilizing film type cores.

Before proceeding with the description of a film core type matrix as illustrated in FIGURE 2, the matrix of FIGURE 1 will be compared with a conventional matrix so as to emphasize the tremendous reduction in wiring and soldering connections or the like required for the invention as embodied in the form illustrated in FIGURE 1. In a conventional coincident current matrix, each plane contains a plurality of cores arranged in columns and rows with the number of cores in a column and row normally being the same. A binary word register in a conventional matrix is comprised of one core from each of the planes in the matrix, and the number of registers is the number of cores in a row multiplied by the number of cores in a column. To form such a matrix there is a drive line associated with each row on each plane with the drive lines for corresponding rows of the different planes being connected by an inter-plane line. In a similar manner there is a second drive line for each column of cores and an inter-plane line connecting the correspoding drive lines between planes. Additionally, there is at least one other line for each plane which threads each one of the cores on the plane and is normally referred to as the sense-inhibit line. This line has no inter-plane connections but may at times be two different lines so that a single line need not be time shared between sensing circuitry and inhibiting means. To add non-destructive interrogation to such a conventional matrix requires the addition of one line between each two planes for each correspondingly located core. As will be presently apparent, such an addition is costly and difficult in assembly, making a matrix monetarily prohibitive because of the amount of extra wiring and solder connections necessary.

To be more specific, let N be the number of planes in a conventional current matrix, X the number of cores in each of the columns of the different planes, and Y the number of cores in each of the rows of the different planes. The number of intra-plane lines in a conventional matrix, having inter-plane connected column and row drive lines, one sense-inhibit line per plane (not inter-plane connected), and one inter-plane connected non-destructive interrogation line per word register, is then $$N+N(X+Y)+NXY$$

and the number of inter-plane lines is $$(N-1)(X+Y+XY)$$

The total number of solder connections (including the ground connection) for such a conventional matrix is $$2(N-1)(X+Y)+4(X+Y)+2N+2XY(N-1)$$

For such a conventional coincident current matrix having 1024 different binary word registers each of which may contain a binary word of 36 bits (binary digits), so that $N=36$, $X=Y=32$, the number of intra-plane lines is 39,204, and the number of inter-plane lines is 38,080, making a total of 77,284. The number of solder connections for such a matrix is 76,488.

For a matrix formed in the manner of FIGURE 1, the number of intra-plane lines is $$N+NX+2NY$$

while the number of inter-plane lines is $$(N-1)(X+Y)$$

and the number of solder connections is $$2(N-1)(X+Y)+2N+2X+2Y+2NY$$

In a 1024 binary word register, each word having 36 bits, X for such a matrix is equal to 36, while N and Y are each equal to 32. Placing these numbers in the above formulas shows that only 6,468 solder connections are necessary for a matrix like that of FIGURE 1. This represents a saving of almost 92%. Similarly, the number of intra-plane lines needed is only 3,232, a saving of over 91%, the number of inter-plane lines required is 2,108, a saving of over 94%, and the total number of lines is 5,340 which represents savings of over 93%.

It is thereby apparent that an almost unbelievable saving in time and material may be accomplished by this invention.

In FIGURE 1 the magnetic cores are represented as toroids. However, it should be understood that the cores may be square, rectangular, or of any configuration including cylindrical, cubic, or solid bar shapes. Additionally, the magnetic cores may be very thin films produced as disclosed in the co-pending United States application of S. M. Rubens, Serial No. 599,100, filed July 20, 1956, now Patent No. 2,900,282.

The embodiment illustrated in FIGURE 2 shows the manner in which this invention may be applied to memory cores prepared as in the last mentioned S. M. Rubens application. Each of the planes 100 and 102, as well as others (not shown) which may be employed, contain an array of film type cores 104 arranged in rows and columns in a manner similar to that of FIGURE 1. Conductor 106 traverses each of the cores on plane 100, while conductor 108 traverses all of the cores on plane 102 in a like manner, there being no inter-plane connection between conductors 106 and 108. These conductors form one drive line for each of the cores on their respective planes. Other drive lines for the cores are represented by conductors 110, 112 and 114. These drive line conductors traverse respectively only the cores in one column on each of the planes, each of these drive lines including an inter-plane connection line 116, 118 and 120 respectively. As in the embodiment of FIGURE 1, the cores in each column of each plane form different binary word registers with plane 100 having three different registers as shown enclosed in dash lines 122, 124 and 126, while plane 102 has registers 128, 130 and 132.

The sense-inhibit conductors 134, 136 and 138 traverse one core in each register on each of the planes in a manner similar to the corresponding lines in FIGURE 1. Each column of cores on each of the planes also includes a non-destructive interrogating conductor 140 which traverses only the cores in a register. Conductors 140 are connected respectively to a source of pulses 142 which when existing provide a field transverse to the remanent axis of magnetization of the film cores. As before explained, the momentary application of a transverse field to the cores in a register tends to rotate the cores' remanent magnetization toward its opposite state, thereby decreasing the remanent magnetization momentarily. A signal is then produced in the sense-inhibit conductors and indicates by its polarity the state of the magnetic cores.

Each of the conductors traversing the magnetic cores is effectively a winding and causes a magnetic field in the core in the same manner as the lines and windings shown in FIGURE 1. In FIGURE 2 the conductor windings have been shown as being to one side of each other, but it should be understood that the various windings could be "stacked" or sandwiched one above the other between layers of insulating material, or on opposite sides of the cores, the only restriction being that the conductor windings lie in a sphere of magnetic influence with the core. Preferably, all of the conductors in the FIGURE 2 embodiment are printed circuits formed in any conventional manner such as by etching or plating. However, the conductors need not be printed circuits but may be lines of any type running adjacent the magnetic cores.

All of the advantages herein stated for the embodiment shown in FIGURE 1 relative to the savings obtained by fewer intra- and inter-plane lines as well as solder connections or the like are also applicable to FIGURE 2 when compared with a conventional coincident current matrix.

Thus, it is apparent that there is provided by this invention systems in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. In a memory matrix system, a physical memory plane of bistable magnetic cores arranged in a plurality of sets, each set being a different binary word register, writing means coupled with each of the cores in the plane for selectively changing the state of any given core, and a plurality of non-destructive interrogating means separate from said writing means and each fully linking a different one and only one of said sets for causing the state of the cores in the respective registers to be interrogated.

2. A system as in claim 1 wherein the means for selectively changing the state of any given core includes winding means for each of the cores in the plane, said winding means being serially interconnected.

3. A system as in claim 2 wherein the means for selectively changing the state of a core comprises second winding means on each of the cores in the plane, the second winding means for each core in a register being serially interconnected.

4. A system as in claim 1 wherein the non-destructive interrogating means causes a field transverse of the remanent axis of magnetization in the cores in a register being interrogated and includes an output winding for each of the cores in a register for carrying a signal indicating by its polarity the state of the core associated therewith in the register being interrogated.

5. A system as in claim 4 wherein the output winding for any one core in each register is serially interconnected with the output winding of a core in another register.

6. A memory matrix system comprising a plurality of physical memory planes each having a plurality of sets of bistable magnetic cores with each set including a different plurality of cores, each different set in each different plane being a different binary word register, writing means for changing the state of each of said cores selectively wherein said means includes first and second winding means for each core for carrying coincident currents respectively to cause a field along the remanent axis of magnetization in the cores, the first winding means for each core in a given plane being interconnected in series and the second winding means for the cores in a given register in each plane being serially interconnected, and a plurality of interrogating means separate from said writing means each linking a different one and only one of said sets for causing the state of the cores in the respective registers to be interrogated.

7. A system as in claim 6 and further including an output winding for each of the cores, the output winding of one core for each of the registers in each of the planes being serially interconnected, the arrangement being such that during interrogation of the cores in a register, the respective output windings provide signals indicating the state of the associated core in a register being interrogated.

8. A memory matrix system comprising a plurality of planes each plane having a plurality of sets of bistable magnetic film cores with each set including a different plurality of cores, each different set in each different plane being a different binary word register, means for changing the state of each of said cores selectively wherein said means includes first and second winding means for each core for carrying coincident currents respectively to cause a field along the remanent axis of magnetization in the cores, the first winding means for each core in a given plane being interconnected in series and the second winding means for each core in a given register in each plane being serially interconnected, a plurality of interrogating winding means each linking a different one and only one of said registers for causing the state of the cores in the respective registers to be interrogated, and further including an output winding means for each of the cores, the output winding means of only one core of each of the registers in each of the planes being serially interconnected, the arrangement being such that during the interrogation of the cores in a register the respective output windings provide signals indicating the state of the associated core in the register being interrogated.

9. A system as in claim 8 wherein each of the winding means and their respective interconnections are printed circuits.

10. A memory matrix system comprising a plurality of planes each having a plurality of sets of bistable magnetic cores, each set including a different plurality of cores and being a different binary word register, a plurality of first coincident current drive lines one for each plane magnetically linking only each core in its plane, a plurality of second coincident current drive lines each magnetically linking a different plurality of registers all in different planes, a plurality of third lines each magnetically linking only one core in each register in each plane and means for selectively interrogating the binary word stored in any of said registers.

11. A system as in claim 10 wherein said interrogating means is of the non-destructive type.

12. A memory matrix comprising a plurality of planes each having a plurality of sets of bistable magnetic cores, there being *n* cores in each set and each different set in each different plane being a different binary word register whereby any given one of said registers extends only within one plane, the total number of registers being capable of storing respectively a like number of binary words each of which may have a maximum of *n* binary digits, a plurality of first coincident current drive lines one for each plane magnetically linking only each core in its plane, a plurality of second coincident current drive lines each magnetically linking a different plurality of registers all in different planes, and means including a plurality of non-destructive interrogating means respectively linking said registers for causing the state of the cores in the respective registers to be interrogated.

13. A system as in claim 12 including a plurality of third lines each magnetically linking a different core in each register in each plane alternatively for inhibiting the affecting of the magnetic state of said cores and for carrying the output signals resulting from said interrogation.

14. A memory matrix system comprising a plurality of physical memory planes each having a plurality of sets of bistable magnetic cores with each set including a different plurality of cores, each different set in each different plane being a different binary word register, writing means for changing the state of each of said cores selectively, and a plurality of interrogating means separate from said writing means and each linking a different one and only one of said sets for causing the state of the cores in the respective registers to be interrogated without destroying the state of the interrogated cores.

15. A system as in claim 14 and further including an output winding from each of the cores in a register, the output windings of corresponding digit order cores of each different register being serially coupled together, the arrangement being such that during interrogation, the polarity of the signal from each of the output windings indicates the state of the core with which the output winding is associated in the register.

16. A system as in claim 14 wherein the non-destructive interrogating means includes means for causing in the cores of the register being interrogated a field which is transverse to the remanent magnetization of the cores.

17. A memory matrix system comprising a plurality of physical memory planes each having a plurality of sets of binary storage devices, each set including a different plurality of said storage devices and being a different binary word register, writing means for selectively changing the state of any of said binary storage devices and means separate from said writing means for selectively nondestructively interrogating the binary word stored in any of said registers.

18. In a memory array:

(A) a plurality of planes consisting of rectangular arrays of film-type magnetic storage elements, (B) each element having its remanent magnetization along a first direction, (C) columns of the elements being defined as digital registers, (D) first and second sets of layered conductors extending along the element columns parallel to the planes, (E) one conductor from each set being associated with only one column register in a plane, (F) one conductor from a set in each column being magnetically coupled to the column elements at least in the first direction, (G) a second one of the conductors from the other set in each column being magnetically coupled to the column elements at an angle to the first direction, (H) and the two conductors crossing each other only in the vicinity of storage elements in each of the respective columns.

19. A memory matrix system comprising a plurality of planes each having a plurality of sets of bistable magnetic film cores with each set including a different plurality of cores, each different set in each different plane being a different binary word register, means for changing the state of each of said cores selectively, and a plurality of non-destructive interrogating means each including means for causing in the cores of the register being interrogated a field which is transverse to the remanent magnetization of the cores, and each linking a different one and only one of said sets for causing the state of the cores in the respective registers to be interrogated.

20. In a memory matrix system, a plane of bistable thin film magnetic cores arranged in a plurality of sets, each set being a different binary word register, printed circuit means coupled with each of the cores in the plane for selectively changing the state of any given core, and a plurality of printed circuit nondestructive interrogating means each fully linking a different one and only one of said sets for causing the state of the cores in the respective registers to be interrogated by creating a field transverse to the remanent axis of magnetization in said cores and further including a printed circuit output winding for each of the cores in a register which printed circuit output winding is serially interconnected by printed circuit conductor means with the printed circuit output winding of a core in another registry for carrying a signal indicating by its polarity the state of the core associated therewith in the register being interrogated.

21. A register-organized memory plane comprising:
- at least one column of a plurality of open flux path type magnetic storage elements each element having its remanent magnetization along an easy axis for forming a multi-bit word register,
- a separate first conductor associated with each of said columns for providing fields substantially parallel to said elements' easy axes,
- a separate second conductor associated with each of said columns each second conductor having first segments angularly disposed with respect to the first conductor in the vicinity of said elements for providing angled fields with respect to said elements' easy axes,
- second conductor second segments serially coupling the angularly disposed second conductor first segments out of the vicinity of said elements and being disposed on alternate sides of adjacent elements of the column.

22. A memory matrix system comprising a plurality of planes each having a plurality of sets of bistable magnetic cores with each set including a different plurality of cores, each different set in each different plane being a different binary word register, means for changing the state of each of said cores selectively, and a plurality of interrogating means for causing interrogation of the cores in a register without destroying the state of the cores, wherein the non-destructive interrogating means comprises two windings for each core in a register, the windings for any one core being so disposed on the core and interconnected in such a manner that current through the windings produces two simultaneously opposing substantially equal fields along the remanent magnetization axis of each core in the register.

23. In a memory matrix system: a plane of bistable magnetic cores arranged in a plurality of sets, each set being a different binary word register; means coupled with each of the cores in the plane for selectively changing the state of any given core and including first winding means for each of the cores in the plane with said first winding means for each of the cores in the plane being serially interconnected and including second winding means for each of the cores in the plane with said second winding means for each of the cores in a register being serially interconnected; and a plurality of register interrogating means each fully linking a different one and only one of said registers for causing the state of the cores in the respective registers to be nondestructively interrogated; said register interrogating means including winding means for each core for causing two simultaneously opposing, substantially equal, fields along the remanent axis of magnetization of the core; and an output winding for each core in a register, the arrangement being such that each output winding has an E.M.F. induced therein uniquely related to the state of the core in the register being interrogated.

References Cited in the file of this patent

UNITED STATES PATENTS

| | | |
|---|---|---|
| 2,649,568 | Felch | Aug. 18, 1953 |
| 2,700,150 | Wales | Jan. 18, 1955 |
| 2,724,103 | Ashenhurst | Nov. 15, 1955 |
| 2,732,542 | Minnick | Jan. 24, 1956 |
| 2,734,184 | Rajchman | Feb. 7, 1956 |
| 2,739,300 | Haynes | Mar. 20, 1956 |
| 2,784,391 | Rajchman | Mar. 5, 1957 |
| 2,832,945 | Christensen | Apr. 29, 1958 |
| 2,933,720 | Newhouse et al. | Apr. 19, 1960 |
| 2,974,308 | Van Tongerloo | Mar. 7, 1961 |

FOREIGN PATENTS

| | | |
|---|---|---|
| 766,037 | Great Britain | Jan. 16, 1957 |
| 532,147 | Italy | Aug. 12, 1955 |
| 769,384 | Great Britain | Mar. 6, 1957 |

OTHER REFERENCES

Publication I: Thesis on Magnetic Cores by M. K. Haynes, Dec. 28, 1950, pages 21–28, #6.

Publication II: Nondestructive Sensing of Magnetic Cores, by Buck and Frank, from Communications and Electronics, January 1954, pages 822–831, #31.

Publication III: "Effect of a Transverse Field on Switching Rates of Magnetic Cores," by Rossing and Rubens, from Journal of Applied Physics, vol. 29, No. 8, August 1958, #78.